(12) United States Patent
Valishin et al.

(10) Patent No.: US 11,613,991 B2
(45) Date of Patent: Mar. 28, 2023

(54) HYBRID SENSING APPARATUS AND METHOD

(71) Applicant: SERCEL, Carquefou (FR)

(72) Inventors: Oleg Valishin, Carquefou (FR); Florent Guichard, Nantes (FR); Frédéric Nicolas, Saint Etienne de Montluc (FR); Clément Visseaux, Carquefou (FR)

(73) Assignee: SERCEL, Carquefou (FR)

( * ) Notice: Subject to any disclaimer, the term of this patent is extended or adjusted under 35 U.S.C. 154(b) by 1085 days.

(21) Appl. No.: 16/217,396

(22) Filed: Dec. 12, 2018

(65) Prior Publication Data

US 2020/0190973 A1 Jun. 18, 2020

(51) Int. Cl.

| | |
|---|---|
| *G01V 1/18* | (2006.01) |
| *E21B 47/135* | (2012.01) |
| *E21B 47/07* | (2012.01) |
| *G01V 1/22* | (2006.01) |
| *G01V 1/24* | (2006.01) |
| *G01V 1/42* | (2006.01) |

(Continued)

(52) U.S. Cl.
CPC ............ *E21B 47/135* (2020.05); *E21B 47/07* (2020.05); *G01V 1/181* (2013.01); *G01V 1/189* (2013.01); *G01V 1/226* (2013.01); *G01V 1/24* (2013.01); *G01V 1/42* (2013.01); *G01V 1/44* (2013.01); *G01V 1/52* (2013.01)

(58) Field of Classification Search
CPC ....... E21B 47/135; E21B 47/07; G01V 1/181; G01V 1/189; G01V 1/226; G01V 1/24; G01V 1/42; G01V 1/44; G01V 1/52
See application file for complete search history.

(56) References Cited

U.S. PATENT DOCUMENTS

| 9,523,790 | B1 * | 12/2016 | Valishin | ................. E21B 47/07 |
| 2004/0216872 | A1 * | 11/2004 | Foster | ................. G01V 11/005 |
| | | | | 166/380 |
| 2012/0046866 | A1 | 2/2012 | Meyer et al. | |

(Continued)

FOREIGN PATENT DOCUMENTS

| CA | 3031157 A1 * | 1/2018 | ............ E21B 17/20 |
| WO | WO-2014159861 A1 * | 10/2014 | ............ E21B 47/08 |

(Continued)

OTHER PUBLICATIONS

Extended European Search Report in corresponding/related European Application No. 19 306 627.1 dated May 13, 2020. (All references not cited herewith have been previously made of record.).

(Continued)

*Primary Examiner* — Krystine E Breier
(74) *Attorney, Agent, or Firm* — Patent Portfolio Builders PLLC

(57) ABSTRACT

A hybrid sensing apparatus for collecting data inside a well, the apparatus including an optical cable that acquires a first set of data; and an array of discrete probes connected to each other with an electrical cable. The discrete probes are configured to acquire a second set of data. The apparatus further includes an attachment system attached to the discrete probes and configured to hold the optical cable. The attachment system is configured to expose the optical cable to directly contact the well.

21 Claims, 11 Drawing Sheets

(51) Int. Cl.
*G01V 1/44* (2006.01)
*G01V 1/52* (2006.01)

(56) References Cited

U.S. PATENT DOCUMENTS

| | | | |
|---|---|---|---|
| 2012/0048541 A1 * | 3/2012 | Jacob | E21B 47/01 |
| | | | 175/50 |
| 2014/0138528 A1 | 5/2014 | Pope et al. | |
| 2017/0363830 A1 | 12/2017 | Park et al. | |
| 2018/0179840 A1 * | 6/2018 | Varkey | E21B 23/01 |

FOREIGN PATENT DOCUMENTS

| | | | | |
|---|---|---|---|---|
| WO | 2014199300 A2 | 12/2014 | | |
| WO | WO-2015076782 A1 * | 5/2015 | | E21B 47/101 |
| WO | WO-2015094180 A1 * | 6/2015 | | E21B 47/024 |
| WO | WO-2019094140 A1 * | 5/2019 | | E21B 19/22 |
| WO | WO-2019209270 A1 * | 10/2019 | | E21B 47/04 |

OTHER PUBLICATIONS

Office Action in related/corresponding European Application No. 19 306 627.1 dated Jul. 20, 2022.

* cited by examiner

HYBRID SENSING APPARATUS AND METHOD

BACKGROUND

Technical Field

Embodiments of the subject matter disclosed herein generally relate to an apparatus and method for acquiring data, and more specifically, to a system that uses discrete sensors and a distributed acoustic sensing system for collecting data, in particular seismic data, for example, inside a borehole.

Discussion of the Background

To extract hydrocarbon fluids (e.g., oil and gas) from a geological formation that is located underground (subsurface), a well needs to be drilled into the earth, either below the water (in a marine environment) or at the earth's surface (land environment). In both situations, various drilling equipment needs to be lowered into the well, most of the times at depths at which the ambient temperatures and pressures are so high that available electronic components are quickly damaged. After the drilling phase, the well is exploited, which means that other type of equipment needs to be installed to allow the hydrocarbon fluids to exit the underground formation. During this production phase, the flow of hydrocarbon fluids needs to be monitored, i.e., measured with various electronic components.

When the hydrocarbon fluid production decreases, there are available methods (e.g., injection of various fluids that promote the flow of hydrocarbon fluids) for enhancing the oil recovery. These methods require different equipment and knowledge of the well.

All these methods share the need to monitor the well, to know the various parameters (e.g., temperature, pressure, density, flow, etc.) of the well and its surrounding, so that the appropriate tool can be deployed in the well and the well is appropriately managed.

There are many devices and systems for measuring/ monitoring the parameters of the well and/or around the well. The traditional device is a temperature and/or pressure tool, which is attached to an electrical cable and lowered into the well for measuring the temperature and/or pressure.

Another traditional device that is deployed inside a well is a seismic sensor, e.g., a geophone. Seismic sensors may be deployed, also attached to a cable, inside the well for measuring seismic signals, either associated with micro-seismic events that happen in the earth, or for measuring seismic signals that are generated by a seismic source at the surface, and then reflected from various geophysical formations underground. The micro-seismic events may be generated due to hydraulic fracturing, or to the extraction of hydrocarbon fluid from underground and the subsequent rearranging of the ground. The seismic source is a man-made source specifically designed to generate acoustic signals that propagate to the geophysical formations of interest and the reflected waves are recorded by the seismic sensors for generating an image of these geophysical formations.

In an effort to overcome the weaknesses of the electronic components of the underground sensors, a new technology has recently been introduced to the oil and gas field. This new technology, distributed acoustic sensing (DAS), uses one or more optical fibers for measuring various parameters inside the well. For an introduction to this technology, see U.S. Patent Application Publication No. 2012/0046866. One advantage of the DAS is that the optical fiber can withstand a high temperature environment much better than the existing electronic components. However, this technology has various limitations on its own, e.g., an interpolation process is used to associate the value of a measured parameter with its actual location underground, whereas an actual location of the measured parameter is not that precise compared to the physical location of the seismic sensor tools, the optical fiber is linear and continuous, without dedicated sensing points. Moreover, the step of data processing is difficult, especially since the measurement concerns an optical constraint (and not a direction of movement), which has to be correlated to useful seismic data.

The assignee of this application has merged the two technologies, i.e., the traditional electronic sensors and the DAS technology, as discussed in U.S. Pat. No. 9,523,790. In this patent, as illustrated in FIG. 1, which corresponds to FIG. 1 of the patent, a hybrid sensing apparatus 100 includes an optical sensing component 110 and an electric sensing component 130. The optical sensing component 110 includes at least an optical cable 112 while the electric sensing component 130 includes at least one sensor 132 that measures a parameter inside the well and generates an electric signal indicative of the measured parameter.

FIG. 1 shows the electrical sensing component 130 extending, inside the well, parallel to the optical cable 112 for a length L1, turning around (U-turn), and then extending anti-parallel to the optical cable 112 for a length L2. FIG. 1 shows hybrid sensing apparatus 100 having a hybrid cable 114 that includes the optical cable 112 and an electrical cable 134. Hybrid cable 114 extends from a head 154A of the well 154, inside the well. Electrical cable 134 extends from a controller 150, located on ground 152, to a telemetry unit 136, located in well 154. Electrical cable 134 may be a traditional copper cable, a heptacable, or any other cable that is currently being used inside a well. Electrical cable 134 may transmit electrical power and/or data to and from sensor 132. Controller 150 may include a processor 156 and a memory 158 that are connected to optical component 110 and electrical cable 134. Controller 150 may also include a power source 160 or it may be connected to a power source.

Electrical cable 134 is electrically connected, through an electrical element 138, to another electrical cable 140 that directly electrically (and mechanically) connects to sensor 132. In this way, sensor 132 can receive power from controller 150 and can exchange data and/or commands with controller 150. Electrical cable 134, telemetry unit 136, electrical cable 140, and sensor 132 form electrical component 130.

FIG. 1 further show that sensors 132 are mechanically coupled, through attachment 142, to hybrid cable 114. This allows the weight of sensors 132 to be supported by hybrid cable 114, so that electric cable 140, for the length L2, can be designed and dimensioned only for transmission of data and power and not for supporting the load of the sensors.

Note that the electrical cable 134 and electrical cable 140 are anti-parallel to each other and sensors 132 extend from the telemetry unit 136 upwards, toward the ground 152. This specific configuration limits the applicability of the DAS system. Thus, there is a need for a device and method that overcome the above noted limitations and also provide accurate downhole measurements.

SUMMARY

In various embodiments, a hybrid sensing apparatus is provided for measuring one or more parameters associated with oil and gas exploration.

In one embodiment, there is a hybrid sensing apparatus for collecting data inside a well. The apparatus includes an optical cable that acquires a first set of data; an array of discrete probes connected to each other with an electrical cable, the discrete probes being configured to acquire a second set of data; and an attachment system attached to the discrete probes and configured to hold the optical cable. The attachment system is configured to expose the optical cable to directly contact the well.

According to another embodiment, there is a discrete probe for measuring data in a well, the discrete probe including a body configured to held a sensor, the body being attached to an electrical cable; and an attachment system located on the body and configured to hold an optical cable, outside the body. The attachment system exposes the optical cable to directly contact the well.

According to another embodiment, there is a method for collecting data with a hybrid sensing apparatus, the method including assembling an array of discrete probes by connecting the discrete probes to an electrical cable; attaching an optical cable to the discrete probes to form the hybrid sensing apparatus; lowering the hybrid sensing apparatus into the well; activating arms of the discrete probes so that parts of the optical cable are pressing directly against the well; acquiring a first set of data with the optical cable; and acquiring a second set of data with the discrete probes.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
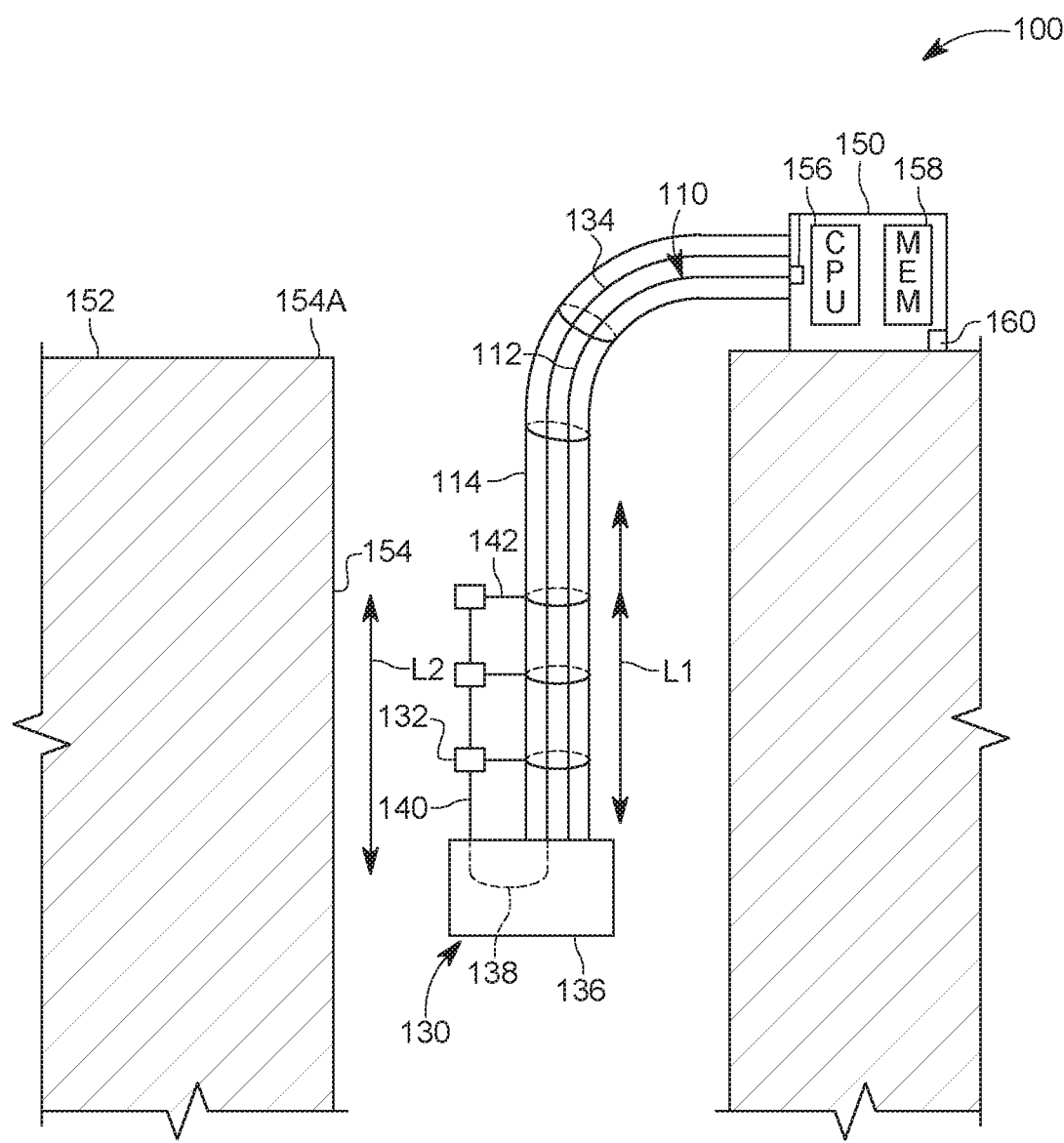
FIG. 1 illustrates a hybrid sensing apparatus deployed in a well.

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, an apparatus and method for measuring one or more parameters associated with a well for oil and gas exploration is discussed. However, the invention is not limited to a well, but it may be used for other seismic exploration cases, for example, 4D seismic surveys.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a hybrid sensing apparatus for collecting data includes a continuous DAS component that acquires a first set of data and a discrete measuring system that acquires a second set of data. The continuous DAS component extends substantially parallel to the discrete measuring system and the continuous DAS component is attached to an array of probes that make up the discrete measuring system so that data measured at a same point, by both systems can be combined.

In this regard, note that the use of the DAS component by itself, for borehole seismic acquisition, is facing the following problems:

Industry's lack of knowledge on the calibration and measurement using DAS;

DAS is a single component measurement, which is sufficient in most cases, but not always, in particular for microseismic;

DAS depth control remains an issue;

The overall sensitivity of the DAS is lower than that of geophones; and

The optical fiber that is part of the DAS component has a directional response, meaning that seismic waves arriving at a right angle (+/−15 degrees) to the optical fiber cannot be sensed by the fiber.

This means that the industry has yet to develop an overall understanding and characterization of a DAS system's performance. In this regard, different from a traditional geophone system, the DAS component's overall sensitivity and characterization is the result of a combined effect of the interrogator performance, acquisition conditions, fiber specifications, fiber condition, fiber packaging in the cable, and cable coupling to the formation—with some of these parameters changing over time, in particular, in case of time lapse monitoring.

In a distributed acquisition system (DAS), the data acquisition is no longer discrete, but continuous all along the optical fiber. Only an electronic surface device is needed to gather seismic data. This makes the solution more reliable and cost effective, but provides data with comparatively poor sensitivity and a low positioning accuracy. Indeed, signal directivity affects the optical fiber response, from a maximum sensitivity along the fiber direction to a complete suppression of the signal in a cross direction.

Figure 2:
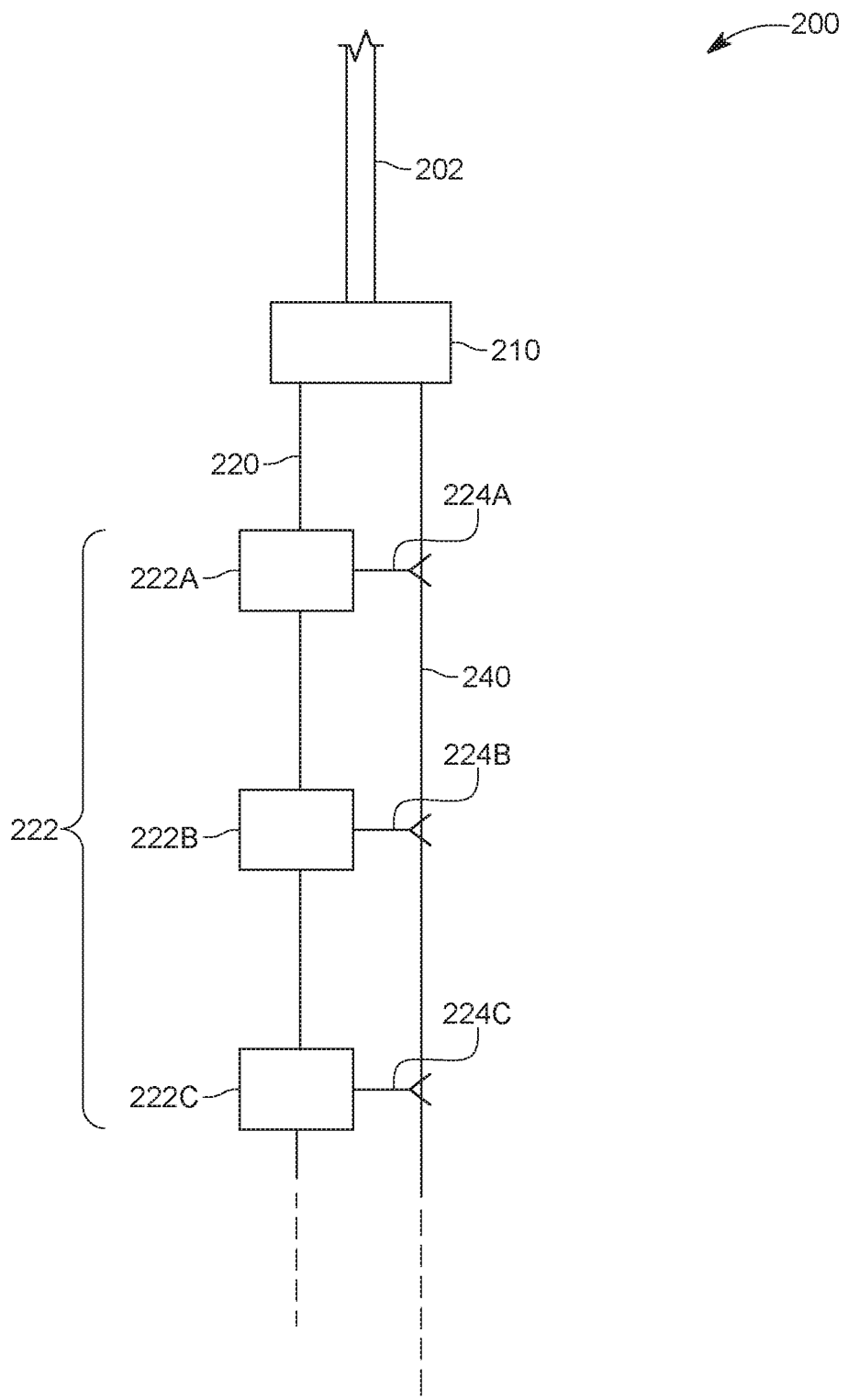
FIG. 2 illustrates a novel hybrid sensing apparatus that exposes an optical cable directly to the well.

The hybrid sensing apparatus is now discussed with regard to FIG. 2. The hybrid sensing apparatus 200 shown in the figure is designed to operate inside a well for oil and/or gas exploration or any well that supports the operation of the oil and gas well. The hybrid sensing apparatus 200 includes an adaptor 210 that achieves a connection (mechanical, electrical and optical) between an electro-optical cable 202, an electrical cable 220, and an optical (or electro-optical) cable 240. A length of the electrical cable 220 could be the same, smaller or larger than a length of the optical cable 240. In one implementation, the optical cable 240 is longer than the electrical cable 220. An array 222 of probes 222A to 222C (only three are shown for simplicity, but the number of probes can be any number equal to or larger than 1) are distributed along the electrical cable 220, at known positions relative to the adaptor 210, so that their positions in the well are known with high accuracy. The optical cable 240 is attached to the plural probes 222A to 222C through dedicated contact members 224A to 224C, as discussed later.

Figure 3:
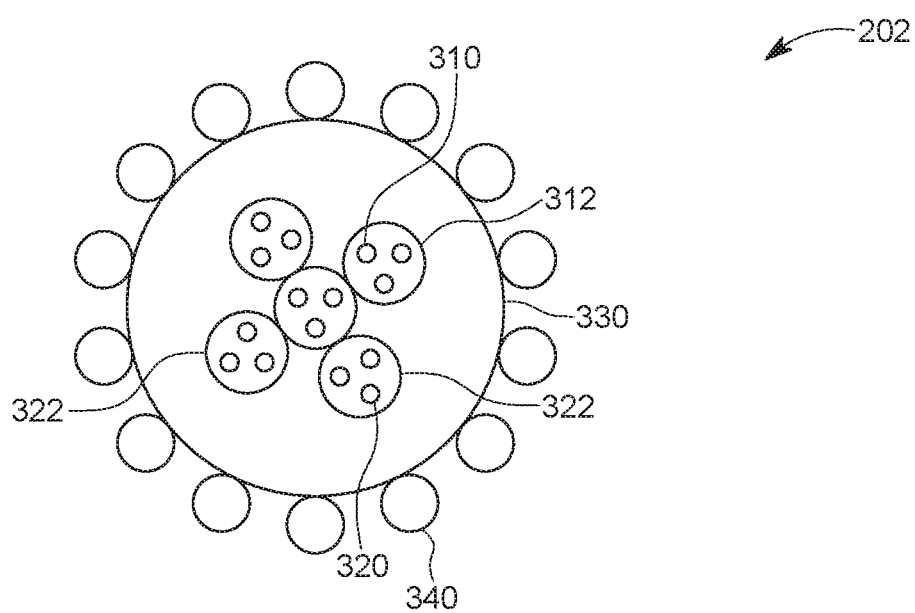
FIG. 3 illustrates a cross-section of an electro-optical cable that is holding the hybrid sensing apparatus.

These various components of the hybrid sensing apparatus 200 are now discussed in more detail. FIG. 3 illustrates the electro-optical cable 202 and its internal structure. In an embodiment, the electro-optical cable 202 may be a hepta-cable with one wire replaced by an optical fiber. The optical fiber may be continuous without cuts, or may have very few cuts along its length and the optical fiber is longer than the electrical cable. In another embodiment, the electro-optical cable 202 may include one or more optical fibers 310 packed together as an optical component 312 (i.e., the optical cable 240 in FIG. 2) and one or more electrical cables 320 packed together as an electrical component 322 (i.e., the electrical cable 220 in FIG. 2). One or more electrical components 322 may be provided inside the electro-optical cable 202. The optical component 312 and the one or more electrical components 322 may then be packed together inside sheath 330. One or more strength members 340 may be distributed around the sheath 330, which may be optional for ensuring that the weight of the array of sensors does not break or apply any tension to the electrical and optical components. One end of the electro-optical cable 202 is connected at the surface to a processing device, to be discussed later, and the other end of the cable is connected to the adaptor 210 as now discussed.

Figure 4:
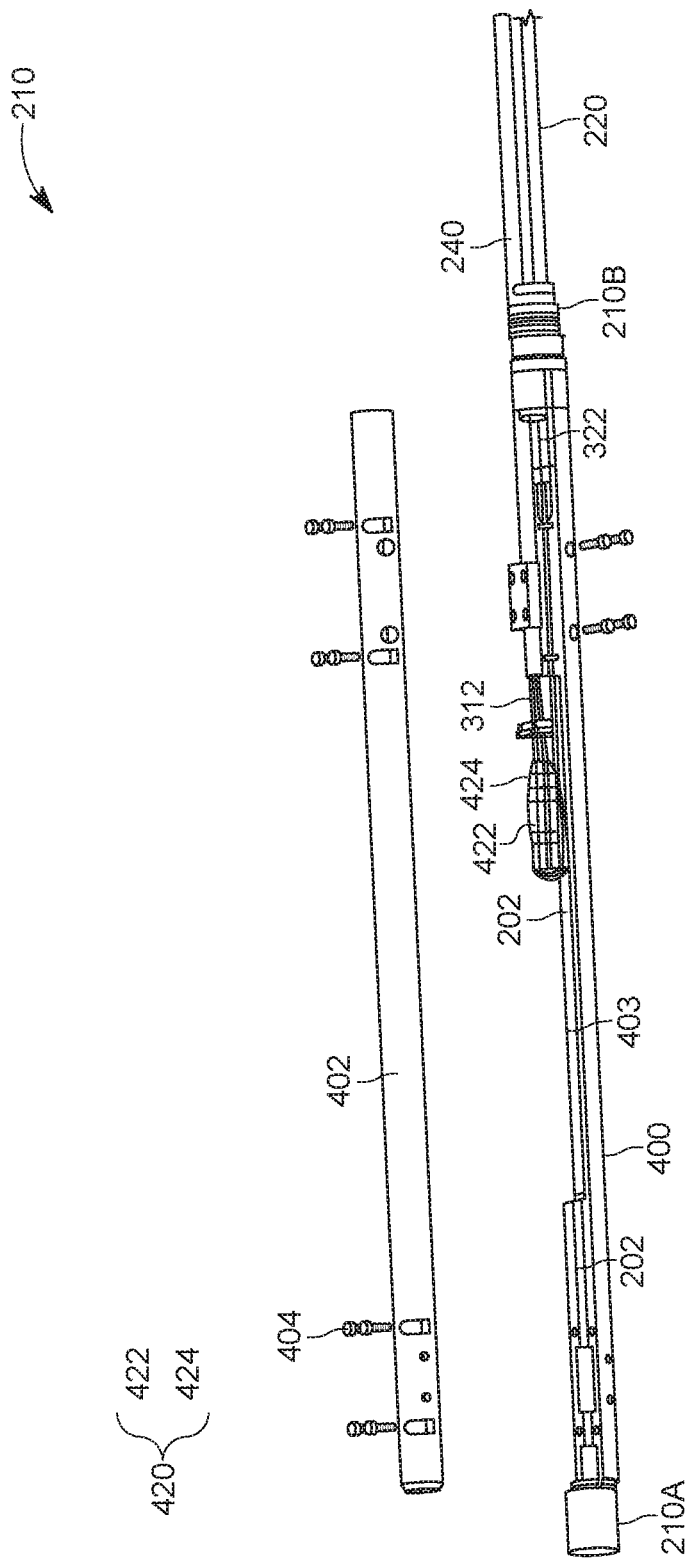
FIG. 4 illustrates an adapter that splits the electro-optical cable into an electrical cable and an optical cable.

One possible implementation of the adaptor 210 is shown in FIG. 4. Adaptor 210 has a body 400 that together with a cover 402 form an internal chamber 403. The cover may be attached with screws 404 to the body 400. Other means for attaching the cover to the body may be used.

The electro-optical cable 202 enters the adaptor 210 at an upstream end 210A and extends through the body 400 toward the downstream end 210B. The optical component 312 of the electro-optical cable 202 is separated from the electrical component 322, inside the body 400 and the optical component 312 is taken out from the body 400 or sleeve 402 at an optical connector 420. Optical connector 420 has a male part 422 and a female part 424. One of these two parts is fixedly attached to the body or cover of the adaptor 210 while the other part is fixedly attached to the optical cable 240. Thus, the optical cable 240, as shown in FIG. 4, extends outside the adaptor 210, away from the upstream end 210A and includes the optical component 312. A protective sheath may be provided over the optical component 312. The electrical component 322 is kept inside the adaptor 210 and forms the electrical cable 220.

Figure 5:
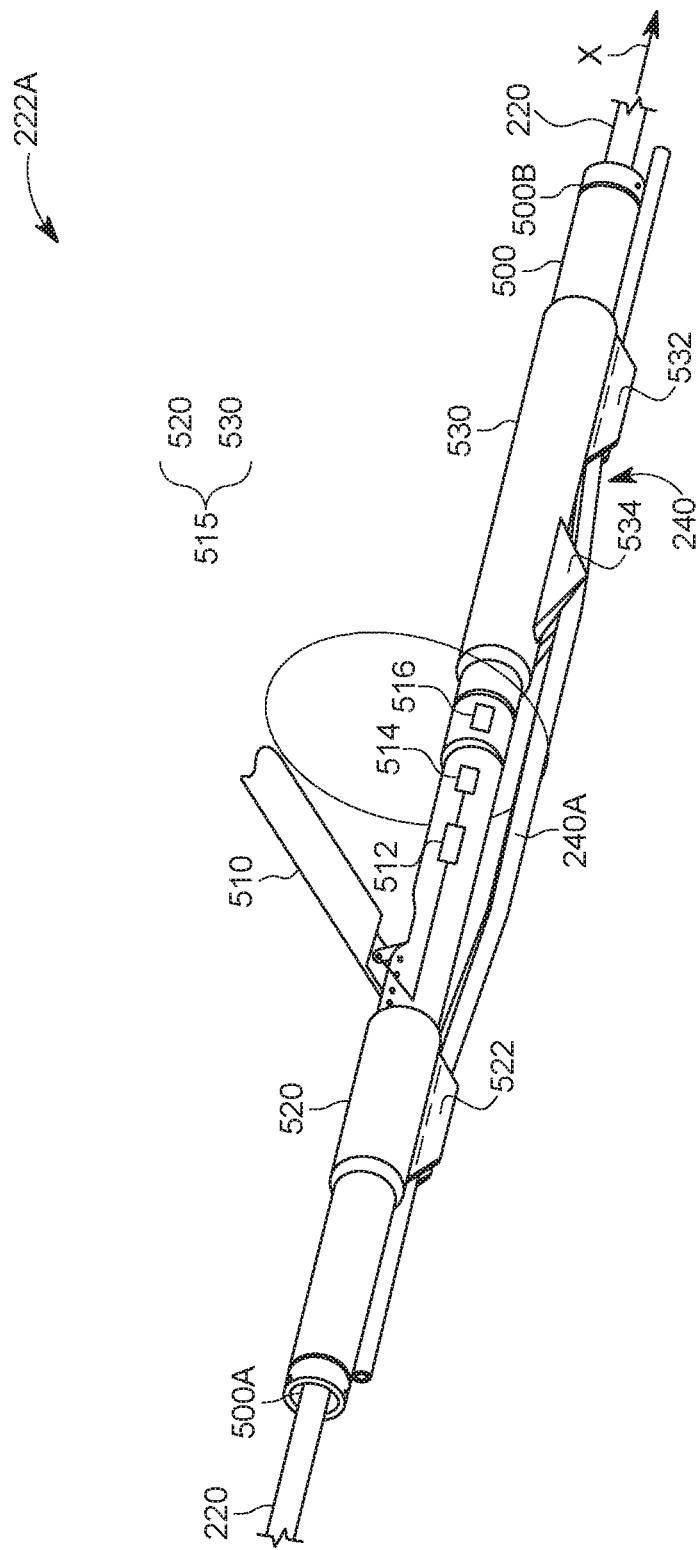
FIG. 5 illustrates a discrete probe that is attached to an optical cable.

The electrical cable 220 is connected at a certain distance D away from the adaptor 210 to a first probe 222A of the array of probes 222. The probe 222A is illustrated in FIG. 5 and has a body 500 that extends along a longitudinal axis X. A diameter of the body is small enough so that the body can be placed inside a well. The body 500 has an upstream end 500A, which is configured to receive the electrical cable 220 and a downstream end 500B, which is configured to also receive the electrical cable 220. In other words, the electrical cable 220 passes through the body 500 while at the same time having one or more connections to various elements distributed inside the body 500 (e.g., motor, sensors, processor, memory). Attached to the body 500 is a coupling device 510, which is implemented in this embodiment as a moving arm (or spring blade), which is configured to open and close based on a spring system or when actuated by a motor 512. However, the coupling device 510 may alternatively be implemented as an active or passive coupling such as magnetic, electromagnetic or bow spring. A controller 514 controls the opening and closing of the blade 510. FIG. 5 also shows one or more sensors 516 being located inside the body 500.

Figure 6A:
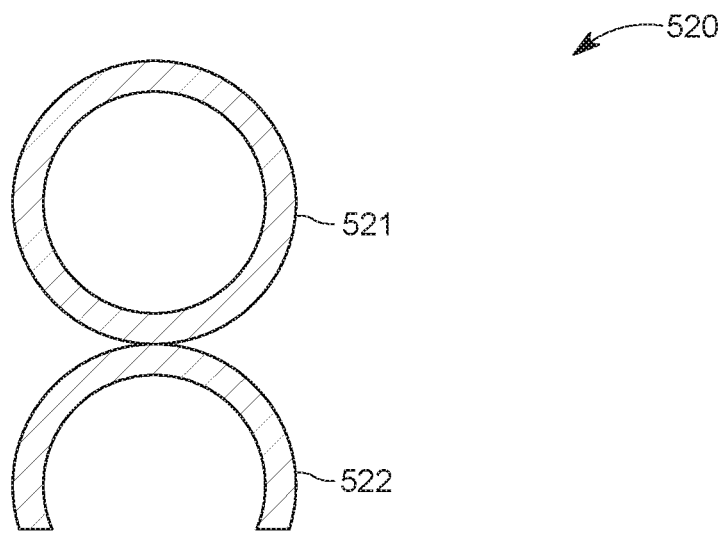
FIGS. 6A and 6B illustrate various cross-sections of an attachment element.
Figure 6B:
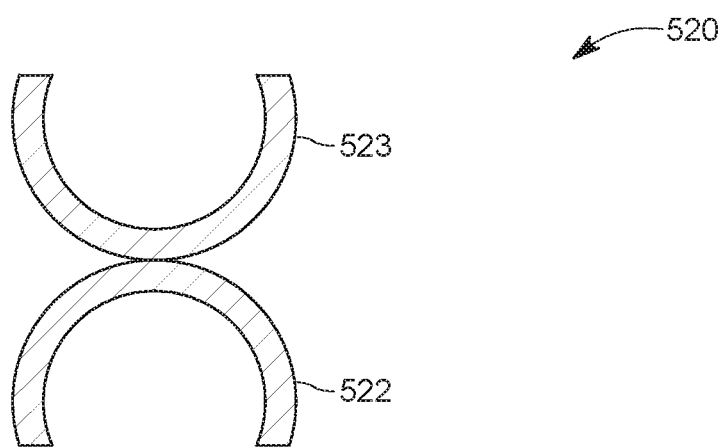

An attachment system 515, which includes first and second attachment elements 520 and 530, is connected to the body 500 of the probe 222A. Although FIG. 5 shows the attachment system 515 having two different attachment elements, one skilled in the art would understand that in one embodiment only one attachment element is used while in another embodiment more than two attachment elements are used. The attachment system 515 is designed, as discussed now, to fixedly attach the optical cable 240 to the discrete probe 222A, but also, to directly press a portion 240A of the optical cable 240 against the casing or the wall of the well in which the hybrid sensing apparatus is located. The first attachment element 520 has a first optical guide 522, which is configured to receive the optical cable 240. The second attachment element 530 has a corresponding second optical guide 532, which is configured to receive the optical cable 240. In this way, the optical cable is prevented from moving (and/or rotating) relative to the probe 222A. A cross-section through either one of the optical guides may be as illustrated in FIG. 6A, having a circular body 521 that is configured to slip over the body 500 and an open part 522, which constitutes the optical guide. The optical guide is shaped to receive the optical cable and hold it in place. The circular body 521 is configured to remain tight over the body 500. One skilled in the art could imagine other shapes of the first and second attachment element for holding the optical cable. For example, as shown in FIG. 6B, the circular body 521 may be replaced with an open body 523, which is configured to snap onto body 500.

Figure 7A:
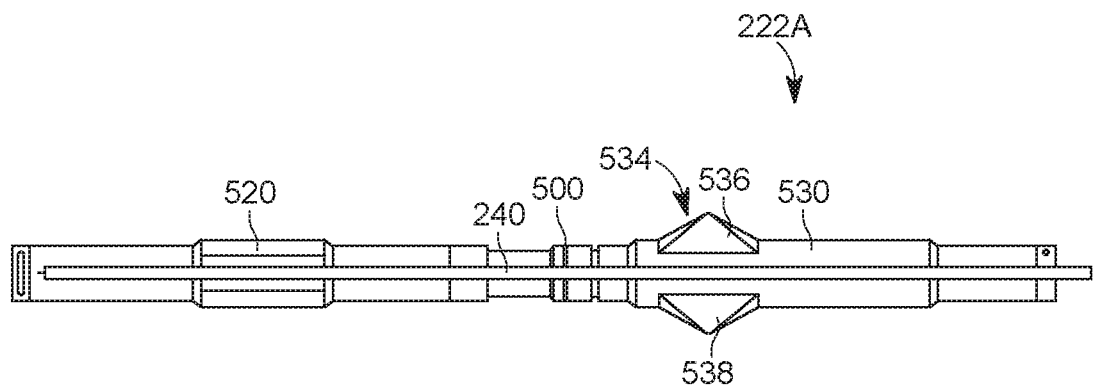
FIGS. 7A to 7C illustrate how the optical cable is attached to the body of the discrete probe so that the optical cable can directly contact the well.
Figure 7B:
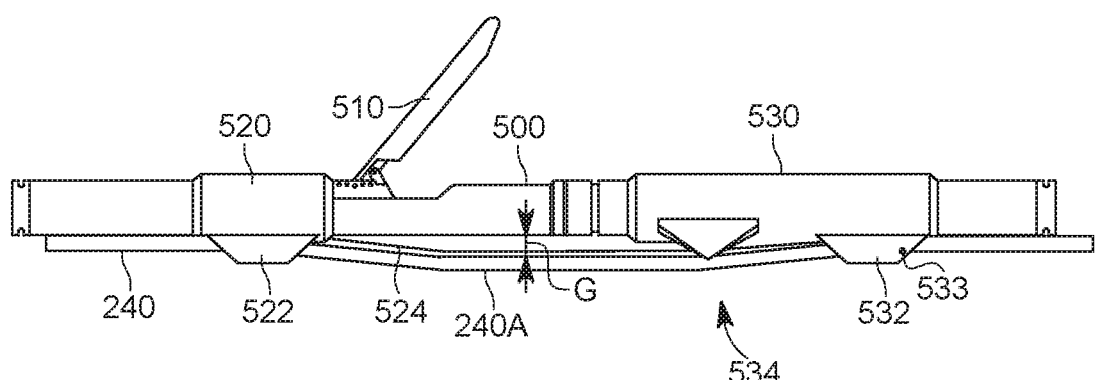
Figure 7C:
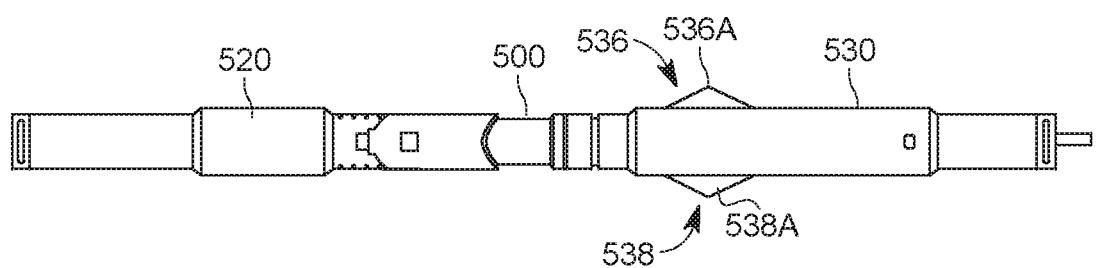

Returning to FIG. 5, the attachment system 515 further includes a contacting element 534, which may be attached to one of the first and second attachment elements (in this embodiment, the contacting element is attached to the second attachment element 530). In one application, it is possible to attach the contacting element 534 directly to the body 500 of the probe 222A. The contacting element 534 is shaped to receive the optical cable 240, but also to position a portion 240A of the optical cable 240 to directly contact the casing or the well. For example, as illustrated in FIGS. 7A to 7C, the contacting element 534 is positioned between the first and second optical guides 522 and 532, and has two wings 536 and 538, which extend away from the body 500. The wings 536 and 538 hold the optical cable 240 in such a way that the cable cannot rotate relative to the body 500. A biasing element 524 (for example a spring or other equivalent element) may be placed between the optical cable 240 and the body 500, for example, next to the first optical guide 522 (other locations may also be used between the first and second optical guides), to push away the optical cable from the body 500, as illustrated in FIG. 7B, so that a gap G is formed between the part 240A of the optical cable 240 and the body 500. In this way, this part 240A of the optical cable 240 achieves a direct contact with the casing in which the discrete probe 222A is deployed, because the tips 536A and 538A of the wings 536 and 538 are designed to be in direct contact with the casing or the well (if there is no casing). The contacting element 534 is open at one end (i.e., the two wings are open) so that the direct contact between (1) the part 240A of the optical cable 240 that is housed by the two wings, and (2) the casing can be achieved. In other words, the contacting element 534 is configured to expose the optical cable to the wall of the well while the biasing element 524 biases the part 240A of the optical cable 240 against the casing or wall of the well.

Figure 8A:
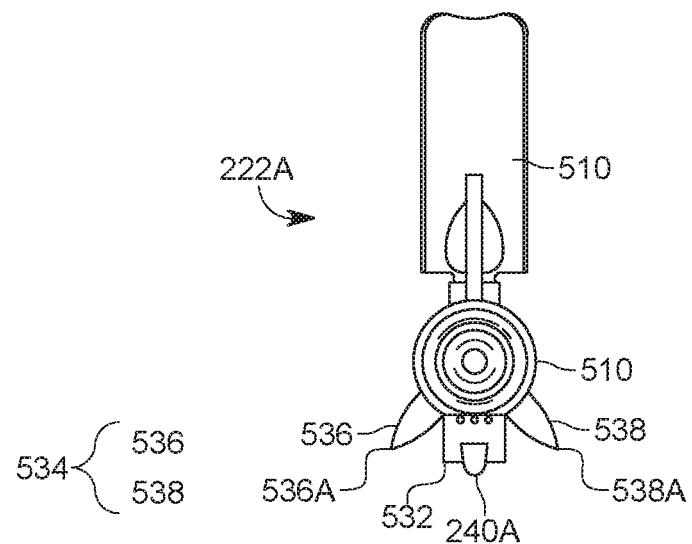
FIGS. 8A and 8B illustrate a front view of the discrete probe when a blade is open and the optical cable is in direct contact with the well.
Figure 8B:
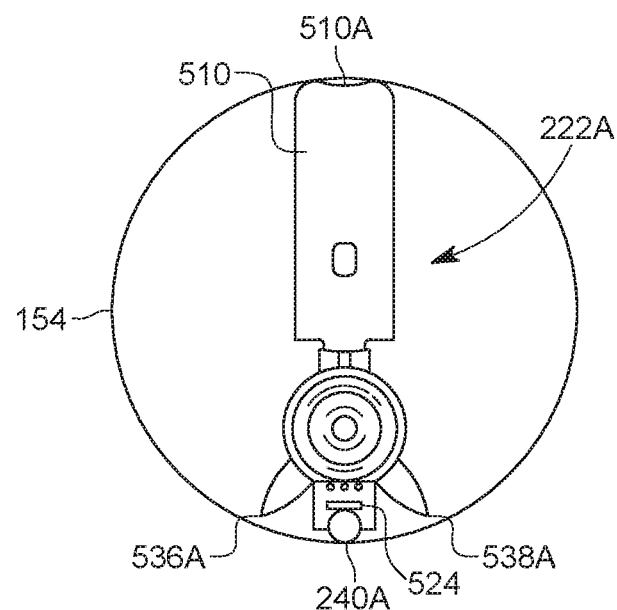

FIG. 8A shows a front view of the probe 224A and its associated part 240A of the optical cable 240 and FIG. 8B shows the same view of the probe 222A, but placed in a casing 154. Note that the second optical guide 532 is also visible in FIG. 8A as this portion is right behind the contacting element 534. FIG. 8B shows that the tips 536A and 538A of the two wings 536 and 538 and a tip 510A of the movable arm 510 of the probe 222A directly touch the well 154, at opposite angular positions.

Returning to FIG. 7B, it is possible to have a holding mechanism 533 attached to the second optical guide 532 for holding the optical cable 240 in place. In one application, the holding mechanism 533 is a screw that closes the opening of the optical guide. In this way, the optical cable 240 is prevented from falling out of the second optical guide. The same mechanism may be used for the first optical guide to ensure that the optical cable stay attached to the probes of the array 222.

By providing the contacting element 534, the probe 222A has three points of contact with the casing (see FIG. 8B), two given by the tips of the wings 536 and 538 and at least one other point of contact given by the first optical guide 522 (not shown in FIG. 8B). In this way, the stability of the probe 222A, when the arm, or blade, 510 is extended and touching the well, is ensured, i.e., the probe 222A does not twist or moves in a radial direction of the well. Because the optical cable 240 touches the casing at each contacting element 534, a measurement of the DAS component at these specific points can be correlated with a corresponding measurement performed by the sensors of the discrete probes 222A and thus, the DAS component can be calibrated with a high accuracy. The probe 222A and any probe in the array 222 may include one or more discrete sensors. These discrete sensors may be pressure, temperature, density, motion (displacement, velocity, or acceleration) and/or radioactivity sensors.

Figure 9:
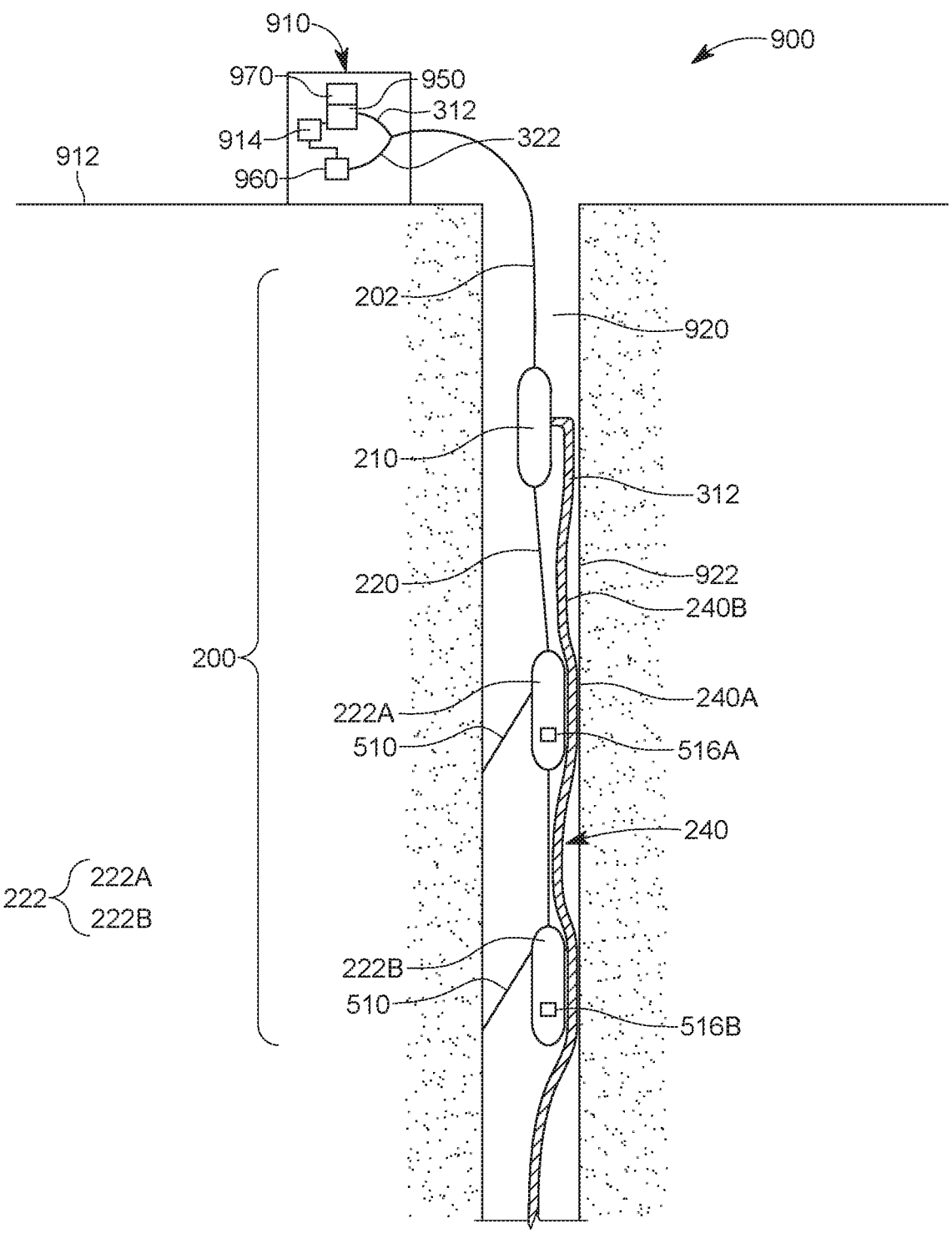
FIG. 9 illustrates a VSP system that uses a hybrid sensing apparatus inside of a well.

The hybrid sensing apparatus 200 may be deployed in a well as a VSP (vertical seismic profile) system 900 as illustrated in FIG. 9. VSP system 900 includes a controller 910 that is connected to the electro-optical cable 202. The controller 910 is placed at the surface 912 and includes the necessary equipment for supplying power and exchanging data with the discrete probes (only two shown in the figure for simplicity) of the array 222 and the optical cable 240. The electro-optical cable 202 is connected to adaptor 210. The optical cable 240 is split from the adaptor 210 and extends down into the well 920, in parallel to the electrical cable 220.

It is noted that the discrete probes 222A and 222B have been fixed in place by actuating their arms 510. This means that a corresponding portion 240A of the optical cable 240 is pressed directly against the casing 922 of the well 920, as illustrated in FIG. 9. Note that another portion 240B of the optical cable 240, which is not anchored to a corresponding discrete probe, may not be in direct contact with the casing 922. The fact that portion 240A is in direct contact with the casing makes its measurement to be more accurate and can be correlated with the measurement performed by the corresponding discrete probe.

This intimate connection of plural portions of the DAS component with the well or casing, at least at certain points that correspond to the discrete probes, has one or more advantages as now discussed. The direct connection between portions of the DAS component 312 and the casing 922 provides a positioning accuracy to the optical fiber of the DAS component due to the known depth control of the discreet probes. This positioning accuracy can be achieved by a range of methods including but not limited to seismic transit time check, noise or heat trace detection of seismic probe adjacent to the fiber, or fiber deformation.

The arrangement illustrated in FIG. 9 allows to keep a discrete measuring directivity, and compensate for the DAS component's directional blindness in the zone of interest, by placing discrete seismic probes in the zones of interest.

The arrangement illustrated in FIG. 9 also allows to correct the optical fiber's directional response by combining the DAS component's single component measurement with the three component measurements obtained from the one or more sensors of the discrete probe. Note that if an accelerometer sensor is provided in the discrete probe, the accelerometer may measure a vector, i.e., a three component measurement. The vector may be a displacement, velocity or acceleration.

The configuration shown in FIG. 9 may compensate and calibrate the optical fiber's sensitivity during the acquisition by using the signals of the discrete probes. For example, when combining the measurements acquired with the discrete probes and those acquired with the continuous optical component, it is possible to place more accurately each measured trace at its location along the optical fiber, thus being able to depth calibrate the optical component for seismic responses. The same may be obtained if, instead of a seismic sensor, temperature sensors are used in the discrete probes as the optical fiber is also able of measuring temperatures.

In one application, the configuration shown in FIG. 9 allows for a better coupling between the optical fiber and the borehole wall by pushing the fiber to the wellbore with the discrete probe's anchoring device.

The VSP system 900 illustrated in FIG. 9 may be used to generate a seismic image of the well's surroundings. The VSP deploys seismic sensors (in the probes) in the well, and then shoots a seismic source (not shown) located on the ground or in a different well, for generating seismic waves. The seismic waves propagate from the seismic source into the ground and then they get reflected and/or refracted on various geophysical underground structures. Part of these reflected and/or refracted waves propagate toward the seismic sensors located in the discrete probes and are recorded by these sensors. Based on the recorded seismic signals, an image of the oil and gas reservoir around the well is determined. By monitoring these images, one skilled in the art is able to estimate the "health" of the well, whether an intervention is necessary to increase the well production, i.e., to manage the well.

Thus, for the present embodiment, controller 910 receives at least two sets of data, a first set 950 generated by the optical component 312 and a second set 960 generated by the sensors 516A, 516B of the discrete probe array 220. Both sets of data may include seismic information, and, as already noted above, the second set may be used to improve the accuracy of the first set. Further, by combining the two sets of data at the processor 914, the accuracy of the recorded seismic traces and their locations is improved. Any known method may be used for this combination.

In a different embodiment, the sensors 516A/516B are not seismic sensors, but another type of sensors, for example, pressure sensors. In this embodiment, the first set of data 950 may be seismic data while the second set of data 960 may be pressure data. This means that the hybrid sensing apparatus 900 can also record two different (seismic and pressure) sets of data. In one embodiment, the two sets of data are recorded simultaneously as the discrete probe array 220 operates independent of the optical component 312. In still another embodiment, the hybrid sensing apparatus 200 can acquire three different sets of data, a first set 950 of seismic data, a second set 960 of pressure data and a third set 970 of temperature data. In other words, the optical component 312 is capable of acquiring, simultaneously or not, two different sets of data, (1) the seismic data 950, which is acquired at one frequency range, and (2) the temperature data 970, which is acquired at a second frequency range. Those skilled in the art would understand that the seismic, pressure and temperature data sets are just examples, as the discrete probe array and the optical component can measure other parameters, e.g., any parameter that impacts the strain on the optical fiber. Just as a further example, there is no need that either the discrete probe array 202 or the optical component 312 records seismic data. Either of these components may record any other data set necessary for well management.

Figure 10:
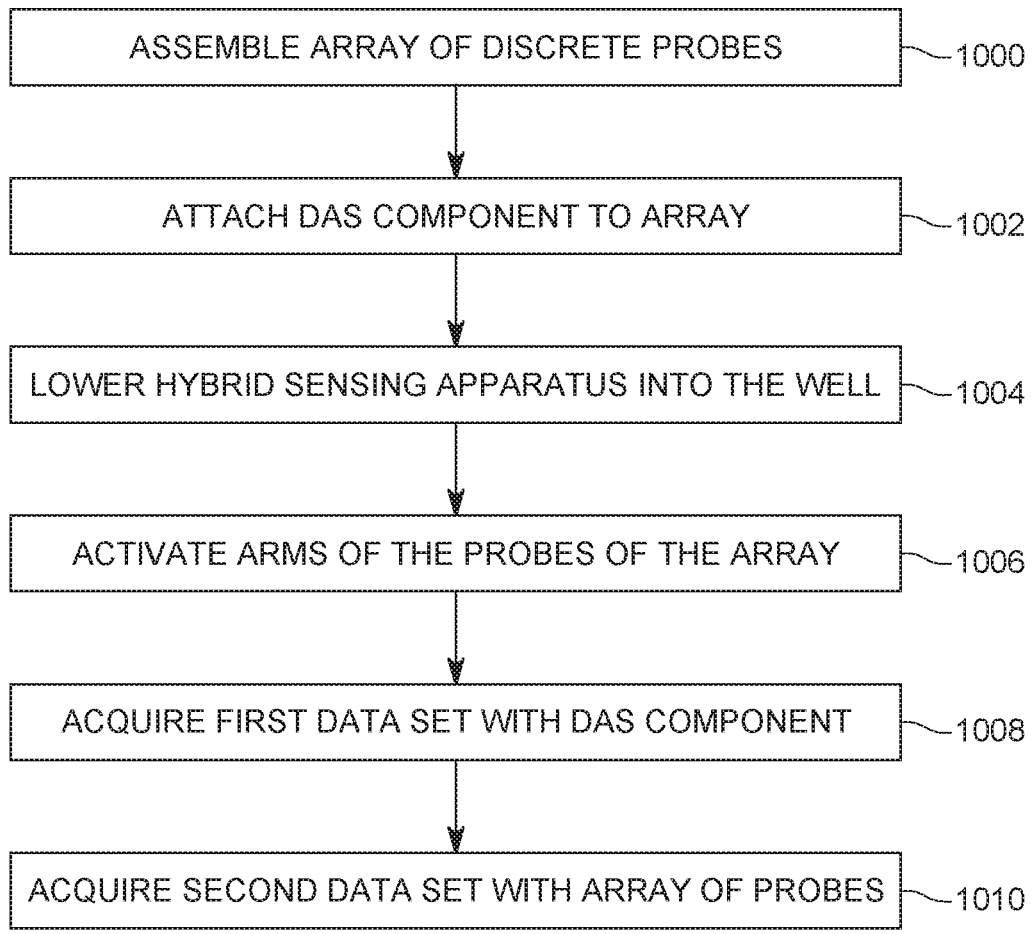
FIG. 10 is a flowchart of a method for collecting different data sets with a hybrid sensing apparatus.

A method for collecting data with the hybrid sensing apparatus 200 is discussed now with regard to FIG. 10. In step 1000, an array 222 of discrete probes 222A is assembled by connecting the probes to each other with an electrical cable 220. In step 1002, a DAS component 312 is attached to each discrete probe 222A, with corresponding attachment elements 520, 530, so that the parts of the DAS component are fixed relative to the discrete probes. In step 1004, the hybrid sensing apparatus 200 is lowered into a well and in step 1006, the movable arms of the discrete probes are activated to bias the probes against the casing or the wall of the well. The DAS component is fixed with the attachment elements relative to the probes such that those portions of the DAS component directly contact the casing or the wall of the well, when the arms of the discrete probes are activated. In step 1008, a first set of data 950 is acquired with the DAS component and in step 1010 a second set of data 960 is acquired with the discrete probes. Note that the sets of data acquired in steps 1008 and 1010 could be acquired in any order, or even simultaneously. In other words, the order of the steps 1008 and 1010 shown in FIG. 10 can be reversed or those two steps can be performed at the same time.

Figure 11:
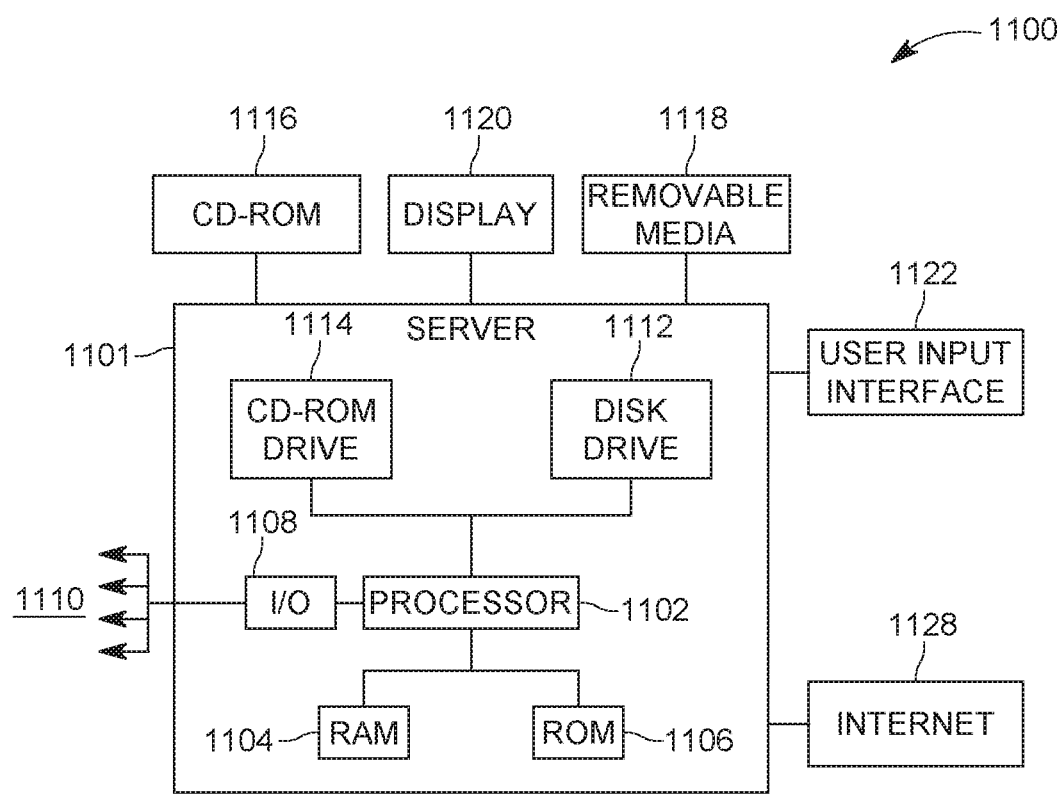
FIG. 11 illustrates a controller that may be used to control the hybrid sensing apparatus to acquire the different data sets of data.

The above-discussed procedures and methods may be implemented with a controller as illustrated in FIG. 11. Hardware, firmware, software or a combination thereof may be used to perform the various steps and operations described herein.

Controller 1100 suitable for performing the activities described in the above embodiments may include a server 1101. Such a server 1101 may include a central processor (CPU) 1102 coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. Processor 1102 carries out a variety of functions as are known in the art, as dictated by software and/or firmware instructions.

Server 1101 may also include one or more data storage devices, including hard drives 1112, CD-ROM drives 1114 and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as sources, detectors, etc. The server may be part of a larger network configuration as in a global area network (GAN) such as the Internet 1128, which allows ultimate connection to various landline and/or mobile computing devices.

The disclosed embodiments provide an apparatus and method for sensing data with a hybrid sensing apparatus. One or more of the embodiments discussed above allows to Provide a continuous DAS sensor above, along and below a series of seismic probes. This provides nearly complete well coverage with one single shot, while providing the benefits indicated below.

Provide a positioning accuracy to the optical fiber DAS measurement by the depth control of the seismic probes. This positioning accuracy can be achieved by a range of methods, including but not limited to, seismic transit time check, noise or heat trace detection of the seismic shuttle adjacent to the fiber, or fiber deformation.

Allow to keep a discrete measuring directivity, and compensate for the DAS directional blindness in the zone of interest, by placing discrete seismic shuttles in the zones of interest.

Allow to correct optical fiber directional response by combining DAS single component measurement with three component measurement.

Allow to compensate and calibrate optical fiber sensitivity during acquisition by using the signal of the seismic shuttles.

Allow a better coupling between optical fiber and borehole wall by pushing the fiber to the wellbore with the seismic shuttle's coupling (anchoring) device.

Allow an electrical conduit for wellbore tractor to tractor the fiber in the well.

Allow a better calibration of the DAS sensor.

It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A hybrid sensing apparatus for collecting data inside a well, the apparatus comprising:
   an optical cable configured to acquire a first set of data;
   an array of discrete probes connected to each other with an electrical cable, the discrete probes being configured to acquire a second set of data;
   an adaptor configured to connect an electro-optical cable to the optical cable and the electrical cable, the optical cable and the electrical cable running parallel underneath the adaptor when the hybrid sensing apparatus is lowered inside the well; and
   an attachment system attached to the discrete probes and configured to hold portions of the optical cable to directly contact a wall or casing of the well.

2. The apparatus of claim 1, wherein portions of the optical cable are fixedly attached to corresponding discrete probes and simultaneously directly contact the wall or casing of the well.

3. The apparatus of claim 1, wherein a discrete probe includes a movable arm which presses against the wall or casing of the well.

4. The apparatus of claim 1, wherein the attachment system comprises:
   a first attachment element fixedly attached to a body of the probe, and having a first optical guide for holding the optical cable.

5. The apparatus of claim 4, wherein the attachment system comprises:
   a second attachment element fixedly attached to the body of the probe, and having a second optical guide for holding the optical cable.

6. The apparatus of claim 1, wherein the attachment system comprises:
   a contacting element that holds the optical cable and a biasing element that biases a part of the optical cable directly against the wall or casing of the well.

7. The apparatus of claim 6, wherein the contacting element includes two wings that expose the optical cable to the well and wherein tips of the two wings directly contact the wall or casing of the well, and the biasing element includes a spring blade.

8. The apparatus of claim 7, wherein the tips of the two wings and a tip of a movable arm of the probe touch the wall or casing of the well at opposite angular positions.

9. The apparatus of claim 1, wherein each probe has a body, a sensor located inside the body, and a movable arm.

10. The apparatus of claim 9, wherein the sensor include accelerometers or geophones.

11. The apparatus of claim 1, wherein both the first and second sets of data are related to seismic parameters for monitoring the well.

12. The apparatus of claim 1, further comprising:
    a controller for collecting the first and second sets of data.

13. The apparatus of claim 1, wherein the optical cable includes an optical fiber with no cuts along its length and the optical fiber is longer than the electrical cable.

14. The apparatus of claim 1, further comprising:
    an adapter that is connected with one end to an electro-optical cable, and the other end is connected to the electrical cable, and has an optical connector that is connected to the optical cable.

15. A discrete probe for measuring data in a well, the discrete probe comprising:
    a body configured to hold a sensor, the body being attached to an electrical cable; and
    an attachment system located outside the body and configured to hold, position and press a portion of an optical cable to directly contact a wall or casing of the well.

16. The discrete probe of claim 15, wherein the attachment system comprises:
    a movable arm which presses the portion of the optical cable against the wall or casing of the well.

17. The discrete probe of claim 15, wherein the attachment system comprises:
    a first attachment element fixedly attached to the body and having a first optical guide for holding the optical cable; and
    a second attachment element fixedly attached to the body and having a second optical guide for holding the optical cable.

18. The discrete probe of claim 15, wherein the attachment system comprises:
    a contacting element that holds the optical cable and biases a part of the optical cable directly against the wall or casing of the well.

19. The discrete probe of claim 18, wherein the contacting element includes two wings that expose the optical cable to the well.

20. A method for collecting data with a hybrid sensing apparatus, the method comprising:
    assembling an array of discrete probes by connecting the discrete probes to an electrical cable;
    attaching an optical cable and the electrical cable to an adaptor configured to connect to an electro-optical cable;
    lowering the adaptor with the electrical cable and the optical cable running parallel underneath into the well, by extending the electro-optical cable;
    activating arms of the discrete probes so that parts of the optical cable are pressing directly against a wall or casing of the well;
    acquiring a first set of data with the parts of the optical cable; and
    acquiring a second set of data with the discrete probes.

21. The method of claim 20, wherein at least one of the first and second sets of data is related to seismic data.

* * * * *